United States Patent Office 3,705,900
Patented Dec. 12, 1972

3,705,900
ISOMER RESOLUTION
Charles W. Ryan, Indianapolis, Ind., assignor to Eli
Lilly and Company, Indianapolis, Ind.
No Drawing. Filed Mar. 9, 1970, Ser. No. 17,924
Int. Cl. C07d *43/24*
U.S. Cl. 260—284  9 Claims

ABSTRACT OF THE DISCLOSURE

A mixture of the D and L isomers of an N-protected substituted glycine is resolved into the separate isomer fractions by first treating with cinchonine to precipitate the cinchonine salt of the L isomer followed by treatment with quinine to precipitate the quinine salt of the D isomer. The D isomer is useful in the preparation of cephalosporin antibiotics.

BACKGROUND OF THE INVENTION

It is known to prepare cephalosporin antibiotics by acylating the amino group in the 7-position of the cephalosporin nucleus with a substituted glycine. Cephalothin, cephaloglycine, and cephalexin are examples of such antibiotics. It is also known that such substituted glycines exist as D and L isomers and that it is the D isomer which results in the biological activity exhibited by the acylated cephalosporin.

By treatment with an acid or base the L isomer is converted to a racemic mixture from which additional D isomer can be separated (Fieser and Fieser, Advanced Organic Chemistry, pages 89–90, Reinhold Publishing Corporation, New York, 1961 and Levene et al., J. Biol. Chem. 86, 703–22 (1930).

Generally, the active cephalosporin is obtained by using the D isomer of the acid for the acylation reaction. It is also necessary to protect the amino group of the glycine during the acylation reaction. A number of amino protecting groups have been used.

SUMMARY

I have now discovered a method for the resolution of a mixture of D and L isomers of an N-protected substituted glycine which comprises treating the mixture with at least one mole of cinchonine in a solvent to form a first precipitate which is primarily the cinchonine salt of the L isomer, separating the first precipitate from the mother liquor, acidifying the mother liquor, removing the solvent and treating the residue after solvent removal with at least one mole of quinine in a solvent to form a second precipitate which is primarily the quinine salt of the D isomer. The protecting group used in protecting the amino group of the substituted glycine is the t-butyloxycarbonyl group. The substituent group on the substituted glycine is phenyl, thienyl, furyl, or phenyl substituted with halogen, $C_1$–$C_4$ alkoxy, $C_1$–$C_4$ alkyl or hydroxy. The solvent employed in the resolution is ethyl acetate, ethyl ether, methyl ethyl ketone, diethyl ketone, isopropanol, or a mixture of two or more of such solvents.

It is an advantage of my process that the D isomer is obtained with the amino group already protected. Thus, this protected D isomer is ready for use in the acylation of a cephalosporin nucleus to obtain a cephalosporin antibiotic.

DESCRIPTION OF THE PREFERRED EMBODIMENT

The N-protected substituted glycine to be resolved by my method is one having the formula

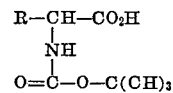

wherein R is phenyl, thienyl, furyl, or phenyl substituted with halogen, $C_1$–$C_4$ alkoxy, $C_1$–$C_4$ alkyl, or hydroxy. Isomerization occurs around the asymmetric carbon atom of such substituted glycines and the compounds exist in both the D and L isomeric forms. Typical substituted glycines falling within the scope of this invention include phenylglycine, thienylglycine, furylglycine, 4-methoxyphenylglycine, 3-chlorophenylglycine, 4-bromophenylglycine, 3-fluorophenylglycine, 3-hydroxyphenylglycine, 4-ethylphenylglycine, 4-butoxyphenylglycine, 4-hydroxyphenylglycine and 2-chlorophenylglycine.

The substituted glycine starting material for may process is one in which the amino group has been protected by formation of the t-butyloxycarbonyl derivative. The t-butyloxycarbonyl group is a well known amino protecting group and methods for its introduction into a molecule are well known. For example, a t-butyloxycarbonyl protected amine may be prepared by treating the free amine with t-butyloxycarbonyl azide.

In accordance with my process, the protected substituted glycine is treated with at least one mole of cinchonine in a suitable solvent. Suitable solvents include ethyl acetate, ethyl ether, methylethyl ketone, diethyl ketone, isopropanol, and mixture of two or more of such solvents. I have had particularly good success with ethyl acetate or mixtures of ethyl acetate and ethyl ether.

The cinchonine reacts with the protected substituted glycine to form the cinchonine salt. The cinchonine salt of the L isomer is insoluble and crystallizes from the solution. It is to be understood that small amounts of the L isomer are left in solution and the crystalline solid contains small amounts of the D isomer.

After separation of the precipitate by some suitable means such as filtration or centrifugation, the mother liquor is acidified to regenerate the D isomer free acid. Suitable acids are mineral acids, such as hydrochloric acid or sulfuric acid. Hydrochloric acid is preferred. The acidification of amine salts of carboxylic acids to regenerate the acid is a procedure well known to those skilled in organic chemistry.

After the free acid has been regenerated from its cinchonine salt, the solvent is removed by some approprite technique such as distillation or evaporation to leave an oily residue which is primarily the D isomer of the acid but which also contains small amounts of the L isomer. Further resolutions is achieved by dissolving this oil in a solvent as described above and adding at least one mole of quinine to the solution. The quinine salt of the D isomer is insoluble and crystallizes from the solution. The quinine salt of the L isomer is soluble to the extent of the small amount of L isomer present so that the precipitate which forms is substantially pure D isomer. Further purification can be achieved by recrystallization from the solvent in accordance with known techniques.

The D isomer free acid can be regenerated from its quinine salt by acidification as described above. This acid is now ready to be used in the acylation of a cephalosporin nucleus to prepare a cephalosporin antibiotic. The amino group of the substituted glycine is already protected by the t-butyloxycarbonyl group and nothing further need be done with regard to the amino group.

This method for the resolution of an N-protected substituted glycine as described above to obtain the D isomer substantially free of L isomer will be further illustrated by the following example.

EXAMPLE

A solution of 10.5 g. (0.039 mole) of DL-2-t-butoxycarboxamido-2-(3-hydroxyphenyl)acetic acid and 11.6 g. (0.039 mole) of cinchonine was prepared in 100 ml. of warm ethyl acetate. After cooling overnight the crystalline solid was collected and washed with ethyl acetate. This solid was the cinchonine salt of the L isomer and had a melting point above 190° C. The filtrate, which contained the D isomer, was treated with dilute hydrochloric acid to obtain the free acid. After removal of solvent, 4.6 g. of noncrystalline oil was obtained. This partially resolved acid (0.017 mole) and 5.4 g. (0.017 mole) of quinine were dissolved in 150 ml. of ethyl acetate. After overnight cooling the crystalline quinine salt was collected and recrystallized from 125 ml. of ethyl acetate yielding 6.8 g. of D - 2 - t - butoxycarboxamido-2-(3-hydroxyphenyl) acetic acid quinine salt. The salt was treated with dilute hydrochloric acid and extracted with ethyl acetate yielding, after evaporation, 2.5 g. of the noncrystalline D isomer, $[\alpha]D = -129°$.

Using this same procedure resolution was effected on a number of other substituted glycines wherein R in the above formula had the following values:

3-chlorophenyl
4-chlorophenyl
3-bromophenyl
3-fluorophenyl
3-methoxyphenyl
4-methoxyphenyl
2-thienyl The N-protected D isomers of these acids were then used to acylate 7-aminocephalosporanic acid or 7-aminodesacetoxycephalosporanic acid to obtain cephalosporin antibiotics. The acylations were generally conducted using the well-known mixed anhydride method of acylation. After acylation, the t-butyloxycarbonyl group was removed by treatment with cold trifluoroacetic acid, all in accordance with known procedures.

In the course of the resolution process novel salts of the L and D isomers are obtained. Thus, there are obtained the cinchonine salt of the L isomer and the quinine salt of the D isomer of an N-protected substituted glycine having the formula

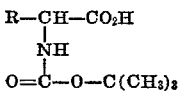

wherein R is phenyl, thienyl, furyl, or phenyl substituted with halogen, $C_1$-$C_4$ alkoxy, $C_1$-$C_4$ alkyl, or hydroxy.

I claim:
1. A method for the resolution of a mixture of D and L isomers of an N-protected substituted glycine having the formula

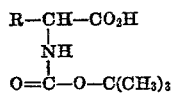

wherein R is phenyl, thienyl, furyl or phenyl monosubstituted with halogen, $C_1$-$C_4$ alkoxy, $C_1$-$C_4$ alkyl, or hydroxy which comprises treating such mixture with at least one mole of cinchonine in a solvent to form a first precipitate which is primarily the cinchonine salt of the L isomer, separating the first precipitate from the mother liquor, acidifying the mother liquor, removing the solvent, treating the residue after solvent removal with at least one mole of quinine in a solvent to form a second precipitate which is primarily the quinine salt of the D isomer and separating the second precipitate from the mother liquor, said solvent being selected from the class consisting of ethyl acetate, ethyl ether, methyl ethyl ketone, diethyl ketone, isopropanol and mixtures thereof.

2. A method as in claim 1 wherein the solvent is ethyl acetate.

3. A method as in claim 2 wherein R is 3-hydroxyphenyl.

4. A method as in claim 1 wherein the solvent is a mixture of ethyl acetate and ethyl ether.

5. A method as in claim 4 wherein R is 3-hydroxyphenyl.

6. The cinchonine salt of the L isomer of an N-protected substituted glycine having the formula

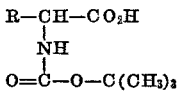

wherein R is phenyl, thienyl, furyl or phenyl monosubstituted with halogen, $C_1$-$C_4$ alkoxy, $C_1$-$C_4$ alkyl, or hydroxy.

7. A salt as in claim 6 wherein R is 3-hydroxyphenyl.

8. The quinine salt of the D isomer of an N-protected substituted glycine having the formula

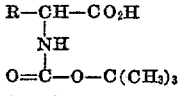

wherein R is phenyl, thienyl, furyl or phenyl monosubstituted with halogen, $C_1$-$C_4$ alkoxy, $C_1$-$C_4$ alkyl, or hydroxy.

9. A salt as in claim 8 wherein R is 3-hydroxyphenyl.

References Cited

UNITED STATES PATENTS

| | | | |
|---|---|---|---|
| 2,794,025 | 5/1957 | Amiard et al. | 260—284 UX |
| 2,921,959 | 1/1960 | Amiard et al. | 260—284 UX |
| 3,243,423 | 3/1966 | Beyerman | 260—471 A |
| 3,325,466 | 6/1967 | Anderson | 260—471 C |

OTHER REFERENCES

Eliel, "Stereo Chemistry of Carbon Compounds," McGraw-Hill, 1962, pp. 50–55.

DONALD G. DAUS, Primary Examiner

U.S. Cl. X.R.

260—332.2, 347.4, 471 R, DIG. 8, 243 C